(12) United States Patent
Atezhev et al.

(10) Patent No.: US 8,005,126 B2
(45) Date of Patent: Aug. 23, 2011

(54) GAS-DISCHARGE LASER

(75) Inventors: Vladimir Vasilyevich Atezhev, Leninski (RU); Sergei Karenovich Vartapetov, Troitsk (RU)

(73) Assignee: Optosystems Ltd., Troitsk (RU)

( * ) Notice: Subject to any disclaimer, the term of this patent is extended or adjusted under 35 U.S.C. 154(b) by 0 days.

(21) Appl. No.: 12/449,534

(22) PCT Filed: Feb. 11, 2008

(86) PCT No.: PCT/RU2008/000077
§ 371 (c)(1),
(2), (4) Date: Aug. 12, 2009

(87) PCT Pub. No.: WO2008/111872
PCT Pub. Date: Sep. 18, 2008

(65) Prior Publication Data
US 2010/0098128 A1  Apr. 22, 2010

(30) Foreign Application Priority Data
Mar. 13, 2007  (RU) ................. 2007108935

(51) Int. Cl.
*H01S 3/03* (2006.01)
(52) U.S. Cl. ............... 372/62; 372/55; 372/57; 372/61

(58) Field of Classification Search .............. 372/55, 372/57, 61, 62
See application file for complete search history.

(56) References Cited

U.S. PATENT DOCUMENTS

| 6,546,036 B1* | 4/2003 | Bragin et al. ............... 372/57 |
| 2006/0078028 A1* | 4/2006 | Kakizaki et al. ............ 372/55 |

FOREIGN PATENT DOCUMENTS

| JP | 2004186310 | 7/2004 |
| RU | 2113749 | 6/1998 |
| RU | 2173923 | 9/2001 |
| RU | 2340990 | 12/2008 |
| WO | WO2006/125433 | 11/2006 |

* cited by examiner

*Primary Examiner* — Jessica T Stultz
*Assistant Examiner* — Kinam Park
(74) *Attorney, Agent, or Firm* — Aleksandr Smushkovich

(57) ABSTRACT

The proposed gas discharge laser comprises extended solid main discharge electrodes, at each of which at least one ultraviolet pre-ionizer is placed, a gas flow area being formed by means of dielectric gas flow guides and the work surfaces of main electrodes and the pre-ionizers being placed outside of the gas flow area for illuminating a space between the main discharge electrodes through a gap defined between the main electrodes and dielectric guides. The proposed invention makes it possible to design a gas discharge laser for a high pulse repetition frequency mode with high-quality laser radiation.

3 Claims, 3 Drawing Sheets

GAS-DISCHARGE LASER

CROSS-REFERENCE TO RELATED APPLICATIONS

This application is a U.S. national stage application of a PCT application PCT/RU2008/000077 filed on 11 Feb. 2008, published as WO/2008/111872, whose disclosure is incorporated herein in its entirety by reference, which PCT application claims priority of a Russian Federation application RU2007108935 filed on 13 Mar. 2007.

FIELD OF THE INVENTION

The present invention relates generally to the field of quantum electronics, in particular, to gas-discharge TE lasers, such as excimer, nitrogen, $CO_2$— lasers, etc.

BACKGROUND OF THE INVENTION

There are known TE lasers, such as one described in U.S. Pat. No. 4,240,044. In this system, a corona-discharge pre-ionizer is disposed near a side surface of one of the main electrodes, wherein a distance from the opposite electrode is greater than a distance between the work surfaces of the main discharge electrodes. The pre-ionizer, however, illuminates only a part of the discharge gap and only one opposite discharge electrode surface, which does not permit obtaining a stable discharge.

An electrode structure of another TE laser is taught in U.S. Pat. No. 6,546,036, which structure comprises corona-discharge pre-ionizers mounted inside of the main discharge electrodes. The pre-ionizers illuminate the whole discharge gap and don't block the gas flow in the discharge gap zone. Since the working surfaces of the main electrodes consist of several parts disposed distantly from each other, the discharge between the main electrodes becomes not uniform and not stable that reduces the quality of laser radiation.

An electrode structure of another TE laser is taught in a Russian Federation patent application RU2007100984. In this structure the inner corona-discharge pre-ionizer electrodes are connected by a conductor that permits obtaining a pre-ionization of the laser gas mixture without high voltage inlets through the chamber of gas-discharge camera.

Another TE laser with a high repetition rate of pulses is known from a Japan patent application JP2004186310. In this laser, the corona-discharge pre-ionizers are disposed on the four sides of the discharge gap, formed by continuous electrodes. However, the pre-ionizers are disposed in the gas flow zone, which increases the gas flow resistance. The gas, moving with a high velocity, forms local turbulence, which extend into the discharge gap. It does not permit effective operation at a high repetition rate of pulses. The arrangement of the pre-ionizers immediately in the flow zone near the main electrodes can lead to parasite discharges between the main electrodes through the pre-ionizers. Moreover, since the pre-ionizers are situated near the main discharge gap formed by the main discharge electrodes, electric field in the main discharge gap is distorted by the presence of the pre-ionizers, which negatively affects the quality of discharge, and decreases the uniformity of the laser light in its cross-section.

GENERAL DESCRIPTION OF THE INVENTION

The primary goal of this invention is the creation of a TE gas-discharge laser, providing effective laser operation in a mode of high repetition rate of pulses. Other goals of the invention may become apparent to those skilled in the art upon learning the present disclose.

The aforementioned goal is achieved by providing the inventive gas-discharge laser comprising: a chamber (a predeterminedly shaped casing), a power supply source, two main continuous elongated solid electrodes, mounted in the chamber, and connected with the power supply source; the main electrodes each includes a work surface, the electrodes' work surfaces define a volume-discharge zone therebetween, the main surfaces are disposed at a predetermined distance from each other, the main electrodes also include side surfaces; at least one pre-ionization ultraviolet radiation source (herein also called a 'pre-ionizer') disposed in a predetermined proximity to the side surface of each of the main electrodes at a distance from the opposite electrode greater than the predetermined distance between the work surfaces of the main electrodes; a pump means for pumping a gas flow mounted in the chamber; a heat exchanger mounted in the chamber; a window for output of the laser radiation mounted in the chamber; a plurality of dielectric guides for guiding the gas flow mounted at the entrance and at the exit of the volume-discharge zone, at least two of the guides are so installed that forming predetermined gaps with the main discharge electrodes; wherein the pre-ionizers are situated outside of a gas flow zone formed by the guides and the main electrodes' work surfaces, and so positioned that the ultraviolet radiation from each pre-ionizer enters the volume-discharge zone through the aforesaid predetermined gaps.

The ultraviolet radiation enters the volume-discharge zone at least from two opposite directions that provides for illumination of shading zones, which shading (dark) zones would take place in case of employing only one pre-ionizer situated at a distance from the opposite electrode greater than the predetermined distance between the electrodes. The inventive gas-discharge laser provides gas ionization within the whole volume-discharge zone, including spaces located in a predetermined proximity of the main electrodes' work surfaces, due to the following features: each electrode has at least one pre-ionizer, the ultraviolet radiation from the pre-ionizers enters the volume-discharge zone and reaches the work surface of the opposite main electrode that creates conditions for a qualitative stable volume discharge.

In addition, since the ultraviolet radiation from pre-ionizers enters the volume-discharge zone through the gap, the illumination of other laser parts is minimized. This allows reducing the level of ultraviolet illumination of isolative (dielectric) surfaces in the laser, which excludes electrical breakdown and reduces losses of energy supplied to the electrodes and caused by surface leakage currents, thereby providing a long-term operation stability of the laser. The mentioned dielectric guides form a substantially uniform gas flow in the volume-discharge zone and reduce the resistance of a contour of the pump means.

Since the pre-ionizers are situated outside of the main gas flow zone, defined by the guides and the work surfaces of the main electrodes, the pre-ionizers don't block the propagation of the high-velocity gas flow, which provides for operation of the laser with a high repetition rate of the pulses.

The pre-ionizers illuminate the volume-discharge zone through the gaps, and they are remote from the work surfaces of the main electrodes and from the guides, which allows preventing a distortion of the electric field in the volume-discharge zone that provides for enhanced discharge uniformity.

The dielectric guides exclude a parasitic electrical breakdown, which could otherwise be initiated by the pre-ionizers. After all, the proposed technical solution permits obtaining a qualitative stable gas volume-discharge between the main discharge electrodes at a higher repetition rate of the laser pulses without parasitic electrical breakdowns along the isolative surfaces as well as through the gas gaps, and to provide a long term operation lifespan of the laser.

In some embodiments, the pre-ionizers are disposed at the exit of the gas flow from the volume discharge zone. In such an embodiment, the gas mass, located in the volume-discharge zone, is not affected by byproducts of operation of the pre-ionizer, and has a higher electrical insulation, since the byproducts are not carried by the main gas flow and not introduced into the volume-discharge zone. Besides, a more uniformed electric field can be formed in the discharge zone due to the absence of gaps between the main electrodes and the guides at the entrance into the discharge zone. The mentioned factors both provide for an improved gas volume discharge for supercharging the laser, which is important for providing enhanced spatial and spectral characteristics of the laser.

In other embodiments, the pre-ionizers are disposed at the entrance into the volume discharge zone. In these embodiments, the gaps between the main electrodes and the guides are situated in the volume discharge zone filled with the gas mass supplied by the pump means, whereat the electric insulation is higher than the electric insulation of exhausted gas at the exit from the volume-discharge zone. This allows arranging the pre-ionizers' work surfaces closer to the discharge gap without causing parasite electrical breakdowns. In turn, this increases the pre-ionization intenseness in the volume-discharge zone, which is important, for example, for $CO_2$ lasers.

In other embodiments, one pre-ionizer is disposed at the entrance into the volume-discharge zone, and the other one is disposed at the exit from the volume discharge zone. Such embodiments provide more uniform illumination of the volume-discharge zone by the pre-ionizers radiation in a cross-section perpendicular to the optical axis of the volume-discharge zone that permits obtaining an enhanced volume discharge in the cross-section, and, accordingly, a more uniform energy distribution within the beam.

In other embodiments, the pre-ionizers are disposed at each side surface of the main electrodes, i.e. at four sides of the volume-discharge zone, which allows obtaining a more intense and uniform illumination of the volume-discharge zone, and, accordingly, a more uniform energy distribution within the laser radiation beam, as well as an increased laser efficiency.

In other embodiments, the guides are mounted with a gap from the main discharge electrodes, and the main electrodes' side surfaces form an additional gas passage, wherein a radiating part of the pre-ionizer is disposed. The additional gas passage maintains the radiating part in an operable condition in the mode of high repetition rate by withdrawing the pre-ionizer's byproducts, and by cooling up the work zone of the pre-ionizer.

In preferred embodiments, the pre-ionizer used in the inventive laser is a corona-discharge pre-ionizer, including an inner and an outer electrodes, divided by an insulator. The corona-discharge pre-ionizer permits obtaining a longitudinally uniform ionizing radiation along the whole electrode length in the laser's gas discharge volume, while employing a compact and simple design.

In some embodiments, at least one pre-ionizer is mounted in a cavity made in the side surface of the main discharge electrode. This permits reducing the electrode system dimensions, and, therefore, decreasing the inductance of the discharge contour that in turn increases the efficiency of electric energy transformation into laser radiation, which is very important for excimer lasers.

In some embodiments, at least one pre-ionizer is mounted in a longitudinal cavity made in the dielectric guide's side surface, facing the main discharge electrode's side surface. This permits minimizing the illumination of other laser parts by the ultraviolet radiation, and avoiding an electrical breakdown along the surfaces of high voltage insulators, which is important for the insulators surfaces and guides situated near the high voltage discharge electrode.

In some embodiments, at least one guide and an insulator of at least one pre-ionizer are integrated into one integrated dielectric element having an inner electrode therein. A first side of the dielectric element faces the gas flow, and a second side of the dielectric element faces the side surface of the electrode. In such an embodiment, the first side functions as a guide of the main gas flow, whereas the second side functions both as a work surface of the pre-ionizer and as a wall of the additional gas passage for withdrawing the byproducts of the corona discharge. This simplifies the design of the laser and facilitates the heat withdrawal from the work surface of pre-ionizer, which work surface is smoothly conjugated with the guide.

In some embodiments, the inner electrodes of corona pre-ionizers are connected by an electric conductor. Such design does not require an additional power supply circuit for the pre-ionizers and additional high-voltage power inlets built in the laser's chamber. This significantly simplifies the overall design of the laser and makes it easy to built.

The proposed engineering solution enables creating a gas discharge laser capable of providing a predetermined high repetition rate mode at a predeterminedly high laser radiation quality.

DETAIL DESCRIPTION OF PREFERRED EMBODIMENTS OF THE INVENTION

Figure 1:
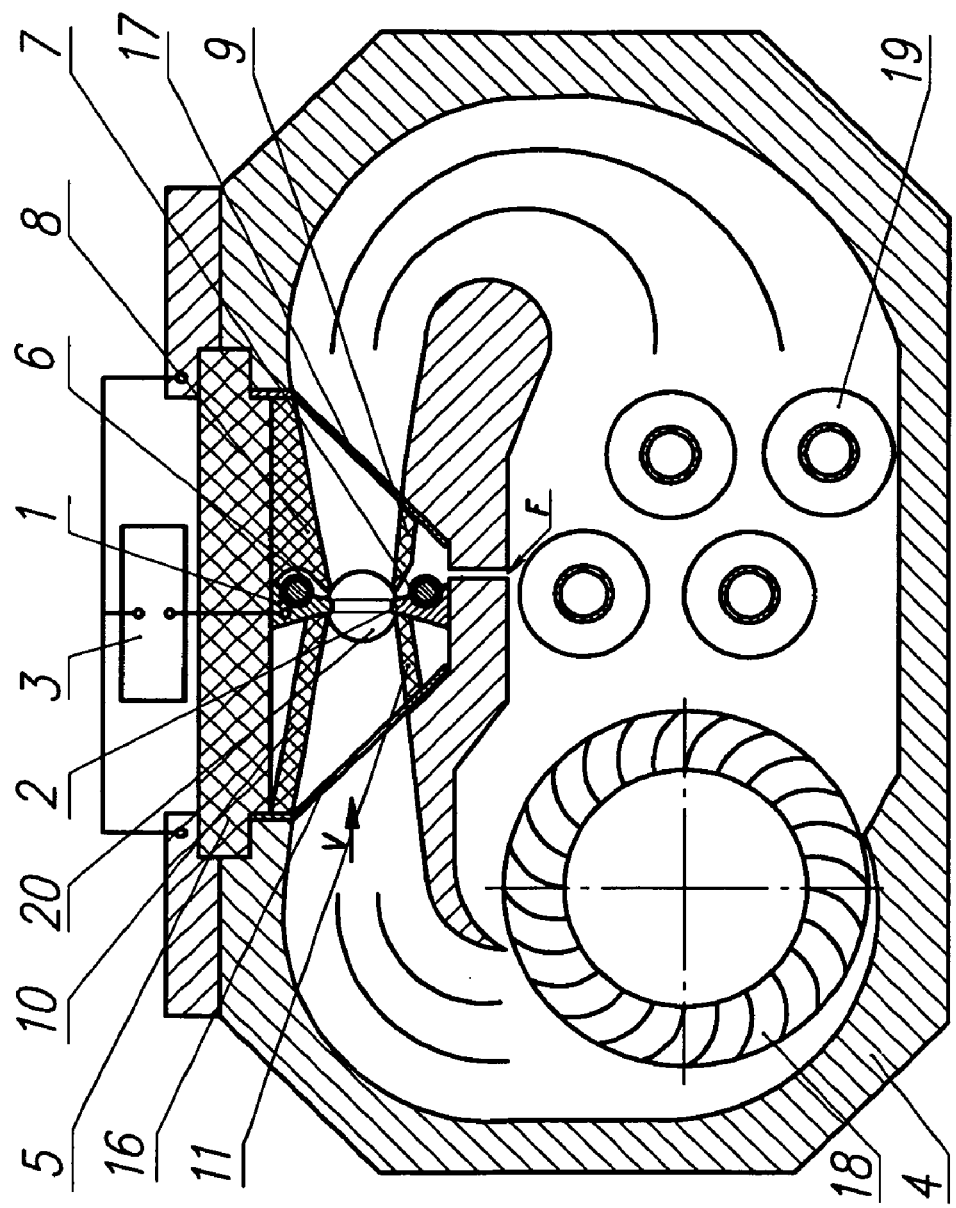
FIG. 1. is a cross-sectional view of the laser, wherein the pre-ionizers are mounted at the exit from the volume-discharge zone and placed in cavities of the electrodes and the guides, according to an embodiment of the present invention.

While the invention may be susceptible to embodiment in different forms, there are shown in the drawing, and will be described in detail herein, specific embodiments of the present invention, with the understanding that the present disclosure is to be considered an exemplification of the principles of the invention, and is not intended to limit the invention to that as illustrated and described herein.

Figure 2:
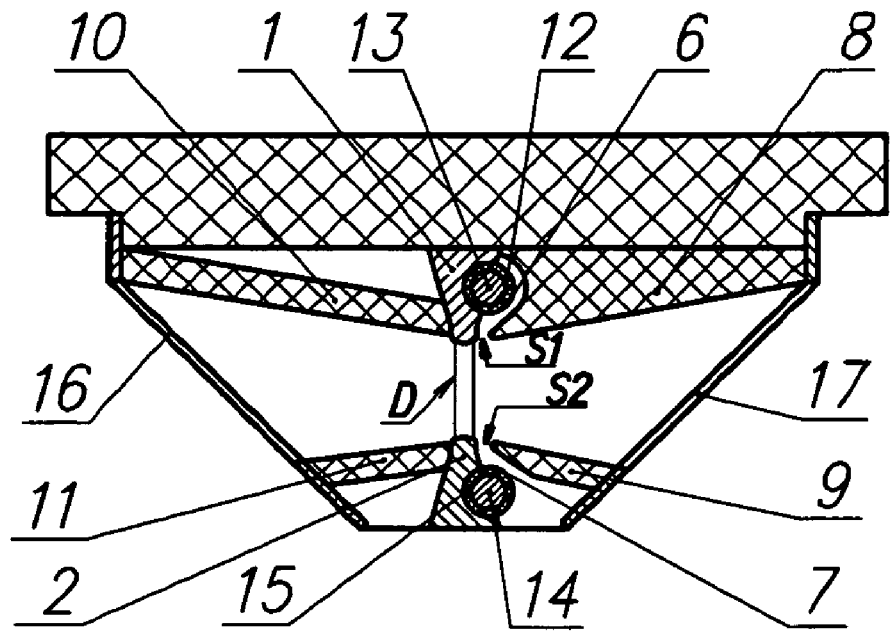
FIG. 2. is a cross-sectional view of the laser's main electrodes, according to the embodiment depicted on FIG. 1.

In FIGS. 1 and 2 there is shown a preferred embodiment of the inventive laser, comprising main electrodes 1 and 2, having work surfaces, disposed at a predetermined distance from each other, and electrically connected with a power supply source 3; the electrodes 1 and 2 are mounted in a chamber 4 hermetically covered by an isolative lid 5. The electrode 1 is a high-voltage electrode and is mounted in the lid 5, whereas the electrode 2 is grounded and low-inductively connected with the power source 3 via 'gas-transparent' electro-conductive buses 16 and 17. The laser comprises a window 20 made in the chamber 4 and serving for output of the laser radiation from the chamber.

The laser comprises a corona discharge pre-ionizer 6, mounted in a cavity of the electrode 1 at a distance from the electrode 2 more than the aforesaid predetermined distance between the electrodes 1 and 2. The main electrode 1 at the same time serves as an outer electrode of the pre-ionizer 6. The laser comprises a corona discharge pre-ionizer 7, mounted in a cavity of the electrode 2 at a distance from the electrode 1 more than the aforesaid predetermined distance between the electrodes 1 and 2. The main electrode 2 at the same time serves as an outer electrode of the pre-ionizer 7.

The laser comprises dielectric guides 8, 9, 10, and 11 capable of guiding the gas flow, and, collectively with the work surfaces of the main electrodes, defining a zone of formation of a high velocity uniform gas flow. The guides 8 and 9 are so mounted that there are gaps S1 and S2 between them and the electrodes 1 and 2 correspondingly. The guides 10 and 11 define walls of a confuser at the entrance of the gas flow into a volume-discharge zone D located between the work surfaces of the main electrodes 1 and 2, whereas the guides 8 and 9 define a diffuser at the exit therefrom. Collectively, the walls of guides 8, 9, 10, and 11 define a diffuser-confuser conduit.

The pre-ionizers include dielectric tubes 12 and 15 with inner electrodes 13 and 14 installed therein respectively. The tubes 12 and 15 are so positioned in relation to the electrodes 1 and 2 and to the guides that are capable of providing the full illumination of the D zone by ultraviolet radiation through the gaps S1 and S2.

The laser comprises a heat exchanger (radiator) 19 for cooling up the gas mixture, and a pump means for pumping the gas mixture, both mounted within the chamber 4. The pump means is represented by a fan propeller 18 that pumps the gas through a confined loop contour. There is a channel F passing along the work surface of pre-ionizer 7, and communicating the contour's zones with different gas pressure.

The laser illustrated on FIGS. 1 and 2 operates as follows. When the laser is turned on, the pump means 18 creates a gas flow in the contour. A uniformed gas flow having a speed exceeding 10 meters per second is produced in the D zone defined by the guides 8, 9, and electrodes 1 and 2. Predetermined high-voltage pulses are inputted between the electrodes 13 and 1, and between the electrodes 14 and 2 producing corona-discharge plasma at the work surfaces of the pre-ionizers 6 and 7. The plasma produces ultraviolet radiation that passes through the gaps S1 and S2, illuminates the work surfaces of electrodes 1 and 2 and the discharge gap, and ionizes the gas in the D zone.

Thereafter, a predetermined voltage is applied to the main electrodes 1 and 2 from the power source 3. This produces a volumetric gas discharge in the gas mixture located in the discharge gap being preliminary ionized by the ultraviolet radiation as described above. Since the D zone is fully illuminated by the pre-ionizers from the two sides, this provides for a quality uniform volume discharge and even energy distribution along the laser beam.

The subsequent high-voltage pulses provide for repeating the aforementioned sequence of processes. Since the ultraviolet radiation reaches the volume-discharge zone through the gaps S1 and S2, the illumination of the other parts of laser is minimized. Exemplarily, the ultraviolet illumination level of the dielectric surfaces of guides 8 and 10 is reduced that excludes electrical breakdowns and reduces losses of energy, supplied to the main electrodes, caused by surface leakage currents. This stabilizes the laser's operation during a long time period.

Since the pre-ionizers 6 and 7 are predeterminedly distant from the work surfaces of main electrodes and from the guides and illuminate the D zone via the gaps S1 and S2, the electric field in the volume-discharge zone is not distorted that provides for substantial uniformity of the discharge. The dielectric guides, having a predeterminedly high electro-isolative capacity, prevent concurrent parasitic electrical breakdowns between the main electrodes and pre-ionizers. It is especially important that they prevent an electrical breakdown in the downstream gas flow that has been worked out for the previous supercharging laser pulse, since this gas flow has a decreased isolative capacity reduced by the discharge byproducts. This allows increasing the frequency repetition rate of laser pulses while keeping the same gas flow speed.

Since the pre-ionizers 6 and 7 are situated out of the main gas flow zone, defined by the work surfaces of main electrodes, and, on the other hand, by the dielectric guides, the pre-ionizers don't impede the propagation of the high-speed gas, which facilitates the operation of the laser with the predetermined high frequency repletion rate. The guides have surfaces made smoothly conjugated with the work surfaces of main electrodes, which provides for a uniform gas flow in the volume-discharge zone, as well as for reducing the resistance of the gas-pumping contour. The above factors allow a higher frequency rate at a lower gas flow speed. This is important, since the power necessary for creation of the gas flow is proportional to the flow speed in the third power (cubed). Therefore, the inventive embodiments illustrated in FIGS. 1 and 2 allow for efficient operation at a sufficiently high discharge quality and at a predeterminedly high frequency repetition rate.

Figure 3:
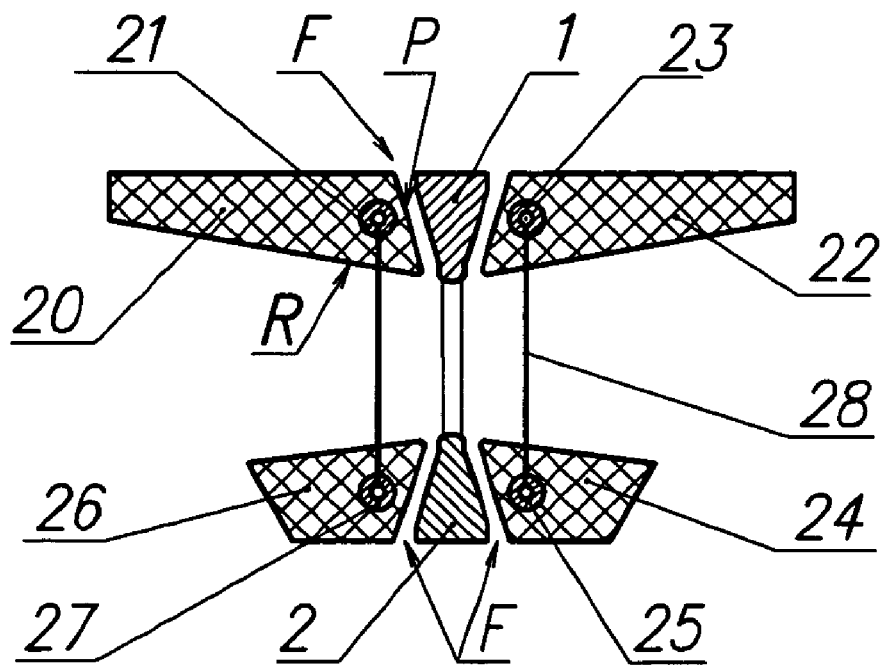
FIG. 3. is a cross-sectional view of the laser's main electrodes, wherein the pre-ionizers are mounted at the entrance into and at the exit from the volume-discharge zone and are made integrally with the guides, according to another embodiment of the present invention.

FIG. 3 illustrates another preferred embodiment of the inventive laser, wherein the pre-ionizer has an electrical insulator integrated with the dielectric guide thereby forming an integrated dielectric element 20. The dielectric element 20 is mounted with a predetermined gap from the main electrode 1. The dielectric element 20 contains an inner electrode 21 disposed in proximity to a work surface P of dielectric element 20 facing a lateral surface of the main electrode 1. The corona discharge is developed at the work surface P. The dielectric element 20 has a remote surface R facing the main gas flow zone whereat no corona discharge is developed. The predetermined gap serves as an additional gas passage F.

The other dielectric guides are also integrated with the respective insulators and form integrated dielectric elements 22, 24, 26, analogously positioned, and containing inner electrodes 23, 25, 27 correspondingly. The spatial dispositions of the work surfaces P of the integrated elements are so chosen that the summed illumination from their corona discharge zones provides for full illumination of the volume-discharge zone.

The embodiment illustrated on FIG. 3 operates analogously to the embodiment shown in FIGS. 1 and 2. Since the pre-ionizers' inner electrodes 21, 23, 25, and 27 are situated in sufficient proximity to the lateral surfaces of the main electrodes 1 and 2, the electric field is maximal in this region, and the pre-ionization corona discharge is developed at the surface P. On the hand, since the pre-ionizers' inner electrodes 21, 23, 25, and 27 are sufficiently distant from the surface R, no pre-ionization corona discharge is developed at the surface R. The surface R must have a predeterminedly high electro-isolative capacity to provide insulation between the high-voltage electrode 1 and the reverse electro-conductive bus 16 (shown on FIG. 2). The inner electrodes 23 and 25 and the inner electrodes 21 and 27 are pair-wise connected by an electric conductor 28.

The integrated elements have a continuous smooth surface that optimizes the passage F between the lateral surface of main electrode 2 and the surface P whereat the corona discharge plasma is formed. The disposition of the pre-ionizers at four sides of the volume-discharge zone allows obtaining a more intense and uniform illumination of the volume-discharge zone along both the longitudinal and the transverse cross-sections of this zone. Accordingly, the energy distribution in the laser beam becomes more uniformed and the overall laser efficiency increases.

Figure 4:
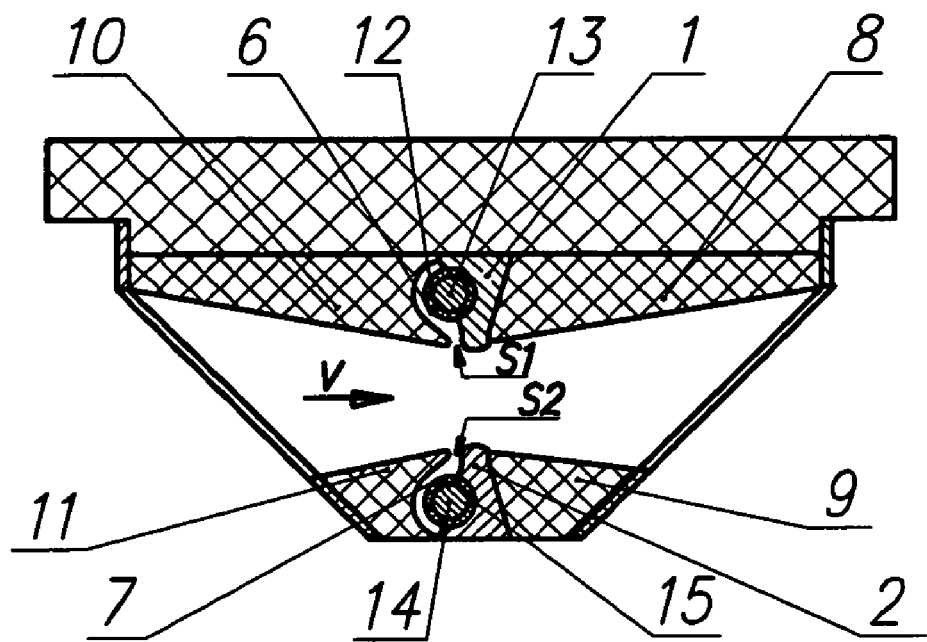
FIG. 4 is a cross-sectional view of the laser's main electrodes, wherein the pre-ionizers are mounted at the entrance of the volume-discharge zone, according to another embodiment of the present invention.
Figure 5:
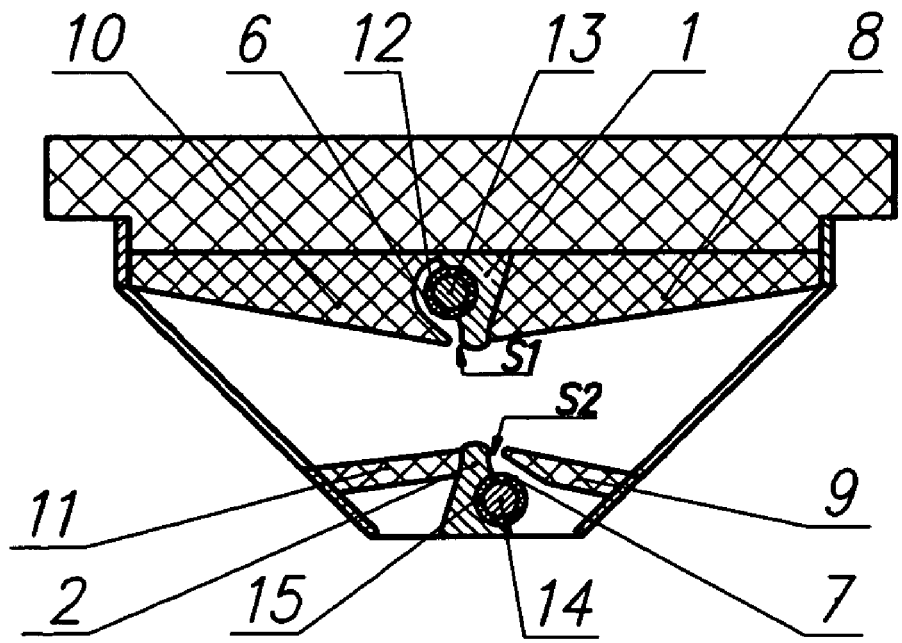
FIG. 5 is a cross-sectional view of the laser's main electrodes, wherein a first pre-ionizer is mounted at the entrance of the volume-discharge zone, and a second pre-ionizer is mounted at the exit of the volume-discharge zone, according to another embodiment of the present invention.

FIG. 4 shows another embodiment, wherein the pre-ionizers 6 and 7 are mounted at the entrance of the volume-discharge zone D. Yet, FIG. 5 shows another embodiment, wherein the pre-ionizer 6 is mounted at the entrance into the D zone, whereas the pre-ionizer 7 is mounted at the exit from the volume-discharge zone D.

INDUSTRIAL APPLICABILITY

The proposed invention can be utilized for designing lasers with a high repletion rate of pulses, such as excimer lasers. In turn, gas lasers with a high repletion rate have various useful applications in different technological processes.

We claim:

1. A gas discharge laser, comprising:
a pair of main electrodes, having:
work surfaces disposed at a predetermined distance from each other and forming a volume-discharge zone, and side surfaces;
at least one pre-ionizer disposed in a predetermined proximity to the side surface of each said main electrode at a distance from the opposite electrode predeterminedly greater than said predetermined distance between the work surfaces of said main electrodes; and
a plurality of dielectric guides for guiding a gas flow inside the laser, said guides are mounted at the entrance and at the exit of said volume-discharge zone, at least two of said guides are so installed that forming predetermined gaps with corresponding said main electrodes;
wherein
said at least one pre-ionizer is situated outside of a gas flow zone formed by said guides and the work surfaces of said main electrodes, and so positioned that ultraviolet radiation from said at least one pre-ionizer enters said volume-discharge zone through said predetermined gaps;
said at least one pre-ionizers each includes a radiation part;
said side surfaces of the main electrodes define an additional gas channel; and
said radiation part is disposed in said additional gas channel.

2. A gas discharge laser, comprising:
a pair of main electrodes, having:
work surfaces disposed at a predetermined distance from each other and forming a volume-discharge zone, and side surfaces;
at least one pre-ionizer disposed in a predetermined proximity to the side surface of each said main electrode at a distance from the opposite electrode predeterminedly greater than said predetermined distance between the work surfaces of said main electrodes; and
a plurality of dielectric guides for guiding a gas flow inside the laser, said guides are mounted at the entrance and at the exit of said volume-discharge zone, at least two of said guides are so installed that forming predetermined gaps with corresponding said main electrodes;
wherein
said at least one pre-ionizer is situated outside of a gas flow zone formed by said guides and the work surfaces of said main electrodes, and so positioned that ultraviolet radiation from said at least one pre-ionizer enters said volume-discharge zone through said predetermined gaps;
said at least one pre-ionizer is represented by two pre-ionizers, wherein one said pre-ionizer is disposed at the entrance side of said volume-discharge zone, and the other said pre-ionizer is disposed at the exit side of said volume-discharge zone;
said at least one pre-ionizer includes a radiation part;
said side surfaces of the main electrodes define an additional gas channel; and
said radiation part is disposed in said additional gas channel.

3. A gas discharge laser, comprising:
a pair of main electrodes, having:
work surfaces disposed at a predetermined distance from each other and forming a volume-discharge zone, and side surfaces;
at least one pre-ionizer disposed in a predetermined proximity to the side surface of each said main electrode at a distance from the opposite electrode predeterminedly greater than said predetermined distance between the work surfaces of said main electrodes; and
a plurality of dielectric guides for guiding a gas flow inside the laser, said guides are mounted at the entrance and at the exit of said volume-discharge zone, at least two of said guides are so installed that forming predetermined gaps with corresponding said main electrodes;
wherein
said at least one pre-ionizer is situated outside of a gas flow zone formed by said guides and the work surfaces of said main electrodes, and so positioned that ultraviolet radiation from said at least one pre-ionizer enters said volume-discharge zone through said predetermined gaps;
said at least one pre-ionizer is disposed at each said side surface of the main electrodes;
said at least one pre-ionizer includes a radiation part;
said side surfaces of the main electrodes define an additional gas channel; and
said radiation part is disposed in said additional gas channel.

* * * * *